Nov. 21, 1933.  L. F. NENNINGER ET AL  1,936,257
MILLING MACHINE
Filed Sept. 13, 1930
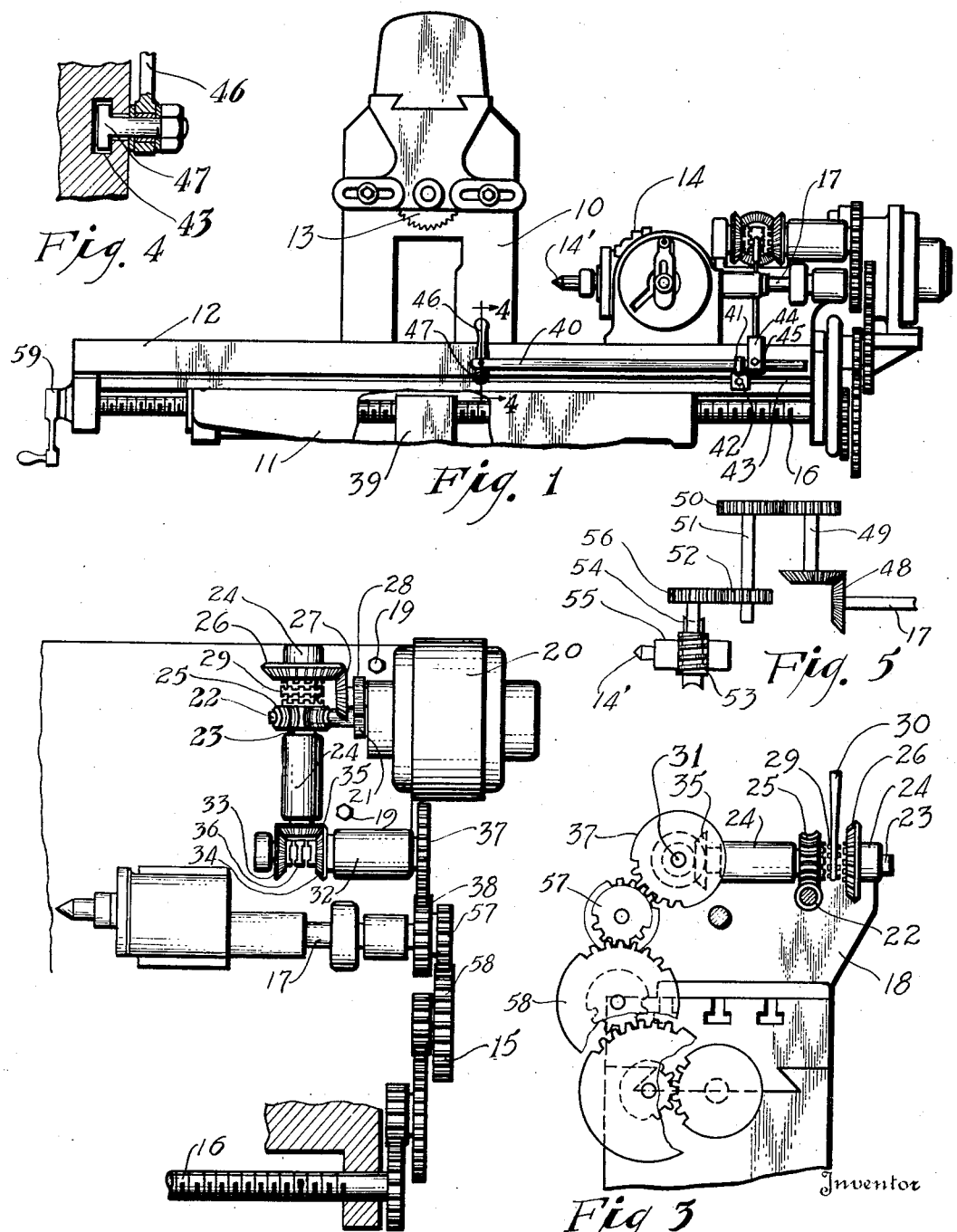
Inventor
LESTER F. NENNINGER
ERWIN G. ROEHM
By
H. H. Parsons
Attorney Patented Nov. 21, 1933

1,936,257

UNITED STATES PATENT OFFICE 1,936,257

MILLING MACHINE

Lester F. Nenninger and Erwin G. Roehm, Cincinnati, Ohio, assignors to The Cincinnati Milling Machine Company, Cincinnati, Ohio, a corporation of Ohio Application September 13, 1930
Serial No. 481,702

5 Claims. (Cl. 90—21)

This invention relates to milling machines and more particularly to attachments therefor.

One of the objects of this invention is to provide a self-propelled attachment for application to a movable support of a machine tool in such a manner that the support may be actuated from the attachment and in synchronous relation thereto.

A further object of this invention is the provision of a milling machine attachment which may be selectively actuated at different rates and in opposite directions from a prime mover self-contained therein and adaptable upon application to the machine to selectively actuate a movable support thereof.

A still further object of this invention is to provide a simplified unitary power unit for the actuation of milling machine attachments and the like.

Other objects and advantages of the present invention should be readily apparent by reference to the following specification considered in conjunction with the accompanying drawing illustrative of one embodiment thereof but it will be understood that any modifications may be made in the specific structural details hereinafter disclosed within the scope of the appended claims without departing from or exceeding the spirit of the invention.

Referring to the drawing in which like reference numerals indicate like parts:

Figure 1 is a front elevation of a milling machine showing one embodiment of this invention.

Figure 2 is an expanded view of the transmission from the prime mover to the attachment and the branch transmission therefrom to the table feed screw.

Figure 3 is an end view of a milling machine table diagrammatically showing the branch transmission from the attachment to the table.

Figure 4 is a section on the line 4—4 of Figure 1.

Figure 5 is an expanded view of the gear train in the attachment.

In the drawing the reference numeral 10 indicates the column of a milling machine which carries a support 11 having reciprocably mounted thereon the table 12. A cutter, such as 13, is journaled in the column adapted to be rotated by suitable power means located therein.

A milling machine is utilized for finishing plane surfaces and may also be used for finishing various types of geometrical surfaces and it is usual to provide special attachments for supporting the work during these latter operations whereby an auxiliary movement in addition to the movement of the table may be imparted thereto for effecting the desired movement relative to the cutter. One such attachment is indicated generally by the reference numeral 14 having a work supporting element 14'. The present device is adapted to impart a rotational movement to the work in addition to the bodily movement imparted by the table and it is desirable that such movements be imparted in synchronous relation with respect to one another.

Heretofore in the actuation of attachments extensive gear trains have been provided for receiving power from the prime mover of the machine and eventually imparting it to the attachment. Such extensive gearing has a considerable amount of lost motion therein which, together with the friction losses, makes it unsatisfactory for such purposes. These difficulties have been overcome in the present invention by providing an attachment having a self-contained prime mover therewith whereby the parts may be more directly actuated and at a more suitable range of speeds than in prior structures.

As embodied herein the device comprises a base or bracket 18 upon which is mounted the prime mover and connected gearing. The bracket has a plurality of bolt holes in its base for attachment to the table of a milling machine as by bolts 19. The prime mover, which may be an electrical motor such as 20, is secured to the bracket and has directly connected to its armature shaft a pinion 21 and a worm 22. A shaft 23 is journaled at right angles to and above the armature shaft in bosses 24 integral with the bracket. The shaft has mounted thereon for free rotation the worm wheel 25 and bevel gear 26. The worm wheel 25 meshes directly with the worm 22 on the armature shaft providing a slow drive while the bevel gear 26 meshes with the bevel pinion 27 which has a gear portion 28 meshing with the pinion 21 on the armature shaft to provide a fast or quick traverse drive. A clutch member 29 splined on the shaft 23 is interposed between the members 25 and 26 which have clutch teeth upon one face for engaging the clutch teeth on the opposed faces of the clutch member. This clutch is adapted to be moved by manual means, such as the handle 30, for selectively effecting rotation of the shaft at a slow or a fast rate.

A second shaft 31 is journaled in the boss 32 of the bracket in the same plane but at right angles to the shaft 23. This shaft carries a reverser unit comprising the bevel gears 33 and 34 which are mounted for free rotation thereon and adapted to be actuated in opposite directions by the bevel gear 35 secured to the end of the shaft 23. A reversing clutch 36 is interposed between the pair of bevel gears 33 and 34 in splined relation to the shaft for movement into driving engagement with either gear for imparting a forward or reverse rotation to the gear 37 attached to the opposite end of the shaft.

The gear 37 meshes with the gear 38 secured to the end of shaft 17 which drives the work supporting element 14' through the gear train shown in expanded view in Figure 5. Attention is invited to the fact that the gears 37 and 38 are change gears constituting a rate changer whereby the rate imparted to the shaft 31 by the prime mover may be varied. These gears may be reversed or new gear pairs of suitable diameter substituted.

The shaft 17 is journaled in the attachment and actuates through a pair of bevel gears 48 the shaft 49 which, through a pair of pinions 50, rotates the shaft 51. This shaft has a spur gear 52 which actuates the worm 53 meshing with the worm gear 54 secured to the spindle 55 through the spur gear 56. It is thus seen that a complete transmission has been provided for actuating the attachment from the prime mover at various rates of speed and in different directions and that the entire device may be detachably mounted upon the machine tool table, such as that of a milling machine.

As previously mentioned, it is desirable in imparting two or more motions to a given work piece to couple the actuators therefor together so that a synchronous movement will result. In the present instance it may be desirable to drive the table in synchronous relation to the attachment and for this purpose a branch transmission has been provided whereby the table may be actuated from the attachment. In furtherance of this a gear train, such as 15, has been provided which is actuated from the shaft 17 through a pair of change gears 57 and 58 constituting a rate changer whereby the rate of movement of the table may be varied without effecting the rate of movement of the attachment. These change gears may be reversed or new pairs substituted for accomplishing rate changes in the movement of the table. Furthermore, if so desired, the gear 57 or its substitute may be removed entirely thereby permitting operation of the attachment without power actuation of the table. In such instances, if desired, the table may be manually operated by means of the handle 59 secured to the end of the feed screw 16. The table feed screw passes through a fixed nut, such as 39, fixed to the table support whereby rotation of the screw by either manual or power means will effect a reciprocating movement in the work table.

For the purpose of facilitating control of the unit the reversing clutch 36 is provided with a remote control comprising a shifter rod 40 having one end slidably mounted in the bracket 41 which is detachably secured to the front edge of the table by a bolt 42 mounted in the T-slot 43. The shifter rod has secured to one end as by a set screw 45 the shifter fork 44 connected to the clutch 36. The opposite end of the shifter rod is pivotally connected to the operating handle 46 which is itself pivotally mounted on a T-bolt 47 also mounted in the T-slot 43. The handle 46 and the bracket 41, it will be noted, are each detachably mounted on the front of the table which thus permits longitudinal adjustment of one with respect to the other thereby making it possible to locate the handle at a point most convenient for the operator while still maintaining an operative connection with the clutch.

From the foregoing description it should now be apparent that an attachment having a prime mover therewith has been provided which may be applied to the table of a milling machine for imparting relative movement to a work piece with respect to a cutter and which may also be utilized for imparting bodily movement to the table.

That which is claimed is:

1. A milling machine having a slidable table and an attachment carried thereby, a prime mover mounted on the table, a transmission extending from the prime mover to the attachment including a rate selector and a reverser in serial power transmitting relationship, a rate changer interposed between the reverser and said attachment for varying the rate of said selector, and a branch transmission extending from the attachment to the table for actuation of the table from the attachment, said transmission including a rate changer whereby the rate of movement of the table may be varied with respect to the attachment.

2. A milling machine having a slidable table and an attachment carried thereby, means for simultaneously actuating the attachment and the table including a prime mover mounted on the table, a transmission extending from the prime mover to the attachment including a worm and a pinion mounted in spaced relation on the shaft of the prime mover, a driving shaft, a worm wheel mounted thereon in driving engagement with the worm, a bevel gear thereon actuated by the pinion, said worm wheel and bevel gear having opposite clutch faces, a clutch member interposed therebetween, means to move the clutch member into engagement with the worm for driving the shaft at a feed rate or in engagement with the bevel gear for driving the shaft at a rapid traverse rate, and means operatively connecting the driving shaft with the attachment.

3. A milling machine having a reciprocable table, an attachment carried by the table, a prime mover mounted on the table, a fast and slow transmission directly connected to the prime mover for actuation thereby, a final transmission extending to the attachment, a clutch for selectively coupling the final transmission to the fast and slow transmission, said final transmission including a reverser in serial power transmitting relationship with the selector clutch, a branch transmission extending from the attachment to the table for actuation of one by the other, means in the final transmission to vary the rate imparted by the slow transmission and thereby control the rate of resultant movement of the table and attachment and additional rate change means in the branch transmission to vary the rate of movement of the table with respect to the attachment.

4. A milling machine having a reciprocable table, an attachment carried thereby, means for simultaneously actuating the attachment and table including a prime mover, a transmission extending from the prime mover to the attachment including a worm and a pinion mounted in spaced relation on the prime mover shaft for direct actuation thereby, a driving shaft, a worm wheel mounted thereon in driving engagement with the worm, a bevel gear mounted on the driving shaft for actuation by the pinion, said worm wheel and bevel gear having opposed clutch faces, a selector clutch interposed between said faces, means to move the clutch into engagement with the worm for driving the shaft at a feed rate or into engagement with the bevel gear for driving the shaft at a rapid traverse rate, a reverser actuated by said driving shaft, a rate changer coupling the reverser to the attachment, and remote control means carried by the table for actuating said reverser.

5. The combination with a milling machine structure including a reciprocable table and a lead screw and nut for effecting reciprocating movement of the table, one of said parts being supported for rotation with respect to the other to produce the reciprocatory feeding movement, of a dividing head carried by the table including a rotatable driven member for actuation of the head, a prime mover carried by the parts and movable therewith, a driving transmission extending from the prime mover to the rotatable member of the dividing head for power actuation thereof, and a rotatable gear transmission extending from the rotary member of the dividing head to the rotatable element of the screw-nut feed mechanism for effecting translation of the table, whereby the prime mover for operation of the dividing head effects a translation of the table in a direction and at a fixed ratio to the rate of rotation of the rotatable member of the dividing head, which ratio is determined by the rotatable connecting gear transmission, the transmission from the prime mover to the dividing head including a reverser for determining the direction of actuation of the rotatable member of the dividing head whereby the direction of rotation of the dividing head member and the direction of translation of the table will be jointly determined by the position of said reverser.

LESTER F. NENNINGER.
ERWIN G. ROEHM.